United States Patent [19]

Bruckstein

[11] Patent Number: 4,858,989
[45] Date of Patent: Aug. 22, 1989

[54] REPLACEMENT SUN VISORS FOR AUTOMOBILES

[75] Inventor: Henry Bruckstein, Toronto, Canada

[73] Assignee: Dopler Industries Inc., Toronto, Canada

[21] Appl. No.: 226,833

[22] Filed: Aug. 1, 1988

[51] Int. Cl.⁴ .............................................. B60J 3/00
[52] U.S. Cl. .................................. 296/97.2; 296/97.12
[58] Field of Search ................ 296/97.6, 97.8, 97.2, 296/97.3, 97.12

[56] References Cited

U.S. PATENT DOCUMENTS

| | | | |
|---|---|---|---|
| 2,112,726 | 3/1938 | Kemp | 296/97.6 |
| 2,118,198 | 5/1938 | Hathaway | 296/97.8 |
| 2,204,691 | 6/1940 | Olsen | 296/97.6 |
| 2,237,770 | 4/1941 | Goldman | 296/97.8 |
| 2,492,074 | 12/1949 | Thompson | 296/97.6 |
| 2,528,038 | 10/1950 | Crise | 296/97.6 |
| 2,596,397 | 5/1952 | Greig et al. | 296/97.12 |
| 2,617,680 | 11/1952 | Knoblock | 296/97.6 |
| 3,105,718 | 10/1963 | Ralls | 296/97.6 |
| 3,159,421 | 12/1964 | Samuelson | 296/97.6 |
| 3,475,080 | 10/1969 | Shumway | 296/97.6 |
| 4,040,657 | 8/1977 | Penzes | 296/97.6 |
| 4,053,180 | 10/1977 | White | 296/97.6 |

*Primary Examiner*—Robert R. Song
*Attorney, Agent, or Firm*—Blake, Cassels & Graydon

[57] ABSTRACT

The invention concerns a sun visor for vehicle such as an automobile. A transparent anti-glare window and a cover for the window is provided in an otherwise opaque sun visor. The cover is movable between a position where it obscures the window and a position in which a user may look through the window. Preferably the cover is hingable along a top edge between its positions. A user may either use the sun visor as an opaque unit, with the cover closed, to block glare or may, with the cover open, look through the anti-glare window for better field of vision.

4 Claims, 2 Drawing Sheets

REPLACEMENT SUN VISORS FOR AUTOMOBILES

This invention relates to replacement sun visors for automobiles.

Modern automobiles almost universally have sun visors which are opaque and which may be pivoted downwardly about a top edge to act as an opaque shield to cast a shadow on the drivers eyes and thereby reduce glare.

These opaque sun visors have various shortcomings among which are that, under some sun conditions, it is impossible to position the visor without also blocking the view of the road. Even when the visor is positioned so that the road may be seen it may block view from the upper part of the windshield, of, for example overhead traffic lights. Moreover, opaque visors are totally useless for night driving when the glare from oncoming headlights is from an angle not shielded by the opaque visor.

It would clearly be desirable to provide a transparent sun visor of tinted and/or polarised sheet material, and various attempts have been made to provide suitably versatile structures. However, problems exist in the provision of transparent sun visors.

The degree of transparency required is different for different driving conditions. A transparent sun visor which reduces glare satisfactorily under very bright conditions may be too dark under conditions which are less bright but which will still cause glare if the visor is lifted to be inoperative. Attempts have been made to mitigate this disadvantage by providing a visor comprising a plurality of transparent panels which are moveable into operative position either separately or together. Such visors are described, for example, in U.S. Pat. Nos. 2,220,429 issued 1940 to Soderberg, 2,204,691 issued 1940 to Olsen, 2,528,038 issued 1950 to Crise, 4,040,657 issued 1977 to Penzes, and 3,475,080 issued 1969 to Shumway. All these transparent panels are made from rigid or semi rigid sheet material which might prove a hazard in the case of an accident. Since the panels are transparent, no safety padding or upholstery is possible as in the case of opaque visors.

U.S. Pat. Nos. 2,118,198 issued 1938 to Hathaway, 3,159,421 issued 1964 to Samuelson and 2,492,074 issued 1949 to Thompson disclose combinations of opaque sun visors with transparent sunvisors attached to their lower edges to mitigate glare not shielded by the opaque visor. This may help to mitigate glare from oncoming head lights at night. However, again all the transparent panels are rigid or semirigid thus possibly constituting an accident hazard.

U.S. Pat. Nos. 2,596,397 issued 1952 to Greig et al, 2,237,700 issued 1941, to Goldman, 2,112,726 issued 1938 to Kemp et al, and 4,053,180 issued 1977 to White all show combination of opaque visor panels with transparent panels. In all cases the supporting rod for the opaque panel or combination of panels is especially designed to carry two panels. The transparent panels disclosed by these patents are, as previously of rigid or semi rigid sheet material constituting a potential safety hazard. This fact has been recognized by the inventor in U.S. Pat. No. 4,053,180 who has made provision for release of the transparent plate to fall downwardly in the case of an accident so as to inhibit likelihood of contact with the face of the driver. Nevertheless, even in the disclosure of this U.S. patent, the transparent plate is preferably glass and is carried by a customized support rod.

This plethora of prior art indicates that the problem has been the subject of considerably igenuity over the years. Nevertheless, it would appear that no very satisfactory solution has been reached in view of the fact that most automobiles are supplied with only conventional opaque sun visors, upholstered both for safety reasons and to conform with the decor of the automobile. These opaque visors may be used in combination with tinted windshields.

Suggestions have been made to supplement these conventional sun visors. For example, U.S. Pat. No. 3,617,680 issued 1952 to Knoblock disclosed the use of a supplementary transparent visor mounted entirely independently of the opaque visor. U.S. Pat. No. 3,105,718 issued 1963 to Ralls discloses a clamping device for clamping a transparent visor to an existing opaque visor, the transparent visor having its own pivoting mechanism. Again both these transparent visors are at least semi-rigid.

An attempt has now been made to overcome the disadvantages of the prior art in providing a composite sun visor having a transparent anti-glare window.

Accordingly the invention provides a sun visor comprising a panel pivotable into a variety of operative positions having a window therethrough, the window being closed by a sheet of transparent anti-glare sheet material.

A flap hingably connected on a rear surface of said panel and co-extensive with said window to be movable between a closed position covering said window and an open position allowing view through said window; and means to releasably hold said flap in said open position.

An embodiment of the invention will now be described by way of example with reference to the drawings in which.

Figure 1:
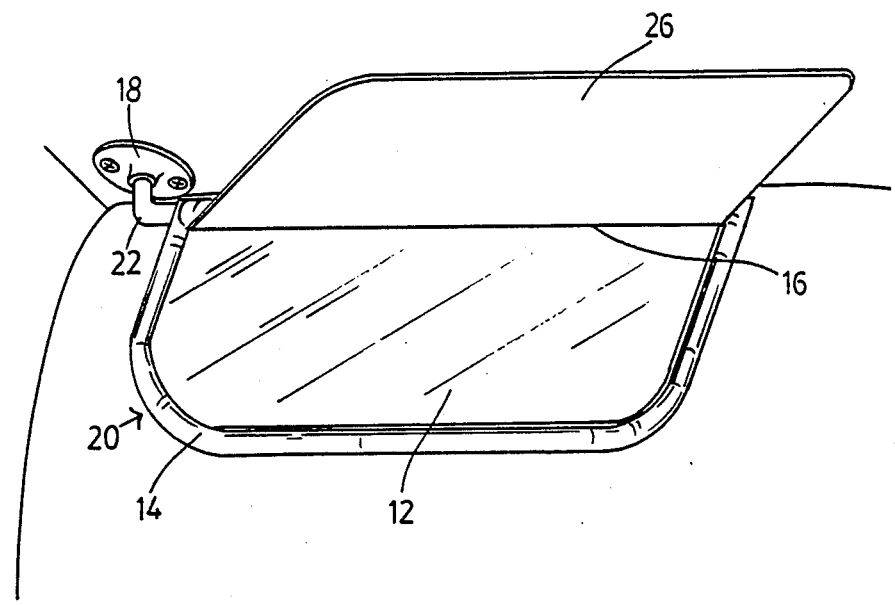
FIG. 1 shows a view of a composite sun visor according to the invention in position for transparent operation.

A vehicle sun visor 20 is pivotable on a pivot shaft 22 from a rearward and upward inoperative position, downwardly and forwardly through various operative positions. The visor 20 comprises an opaque visor of conventional rigidity and upholstery. These characteristics are a matter of mere choice. More importantly the visor comprises a hinged flap 26 covering a window 12 in the visor, the window being surrounded by a frame part 14.

The window 12 may be a sheet of flexible transparent anti-glare material and may comprise a substantial part of the forward surface of the visor. The material may be tinted and or be adapted to transmit only polarised light. The depth of tinting may be constant for any one sheet or may vary from a lighter tint at the bottom of the sheet to a deeper tint at the top for use in sunlight. Alternatively a material may be used which automatically changes the depth of tint according to the brightness of the environment.

The flexible sheet may be made from any suitable material such as polyethyelene, or, rigid or semi-rigid transparent materials such as glass.

Figure 2:
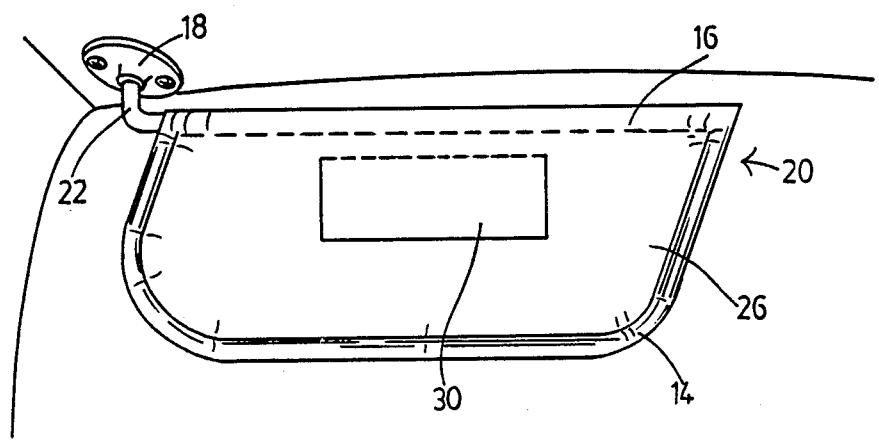
FIG. 2 shows a view of the sun visor of FIG. 1 in position for opaque operation.

The flap 26 is coextensive with the window 12 and is hinged at a hinge 16 between the top edge of the flap and the frame 14 rearwardly of the window 12. Thus, when flap 24 is in a closed position it covers window 12 and the visor 20 appears from the rear to be a conventional opaque visor and is usable as such (see FIG. 2). When flap 24 is in an open position, it is hinged away from the visor as shown in FIG. 1 and window 12 is exposed.

The flap 26 should be releasably retainable in its open position so that vision through the transparent window 12 may be maintained. The retention of the flap may be by any convenient means. For example hinge 16 may be designed such that there is sufficient friction to inhibit closing of the flap under its own weight; the hinge 16 may be carried into engagement with a stop from which it may be manually disengaged; or catch means, for example VELCRO (Trade mark) fastenings between the frame 14 and the flap 26. None of the possible retention means for releasably maintaining the flap 26 in its open position, are shown, since these are a matter of choice.

Figure 3:
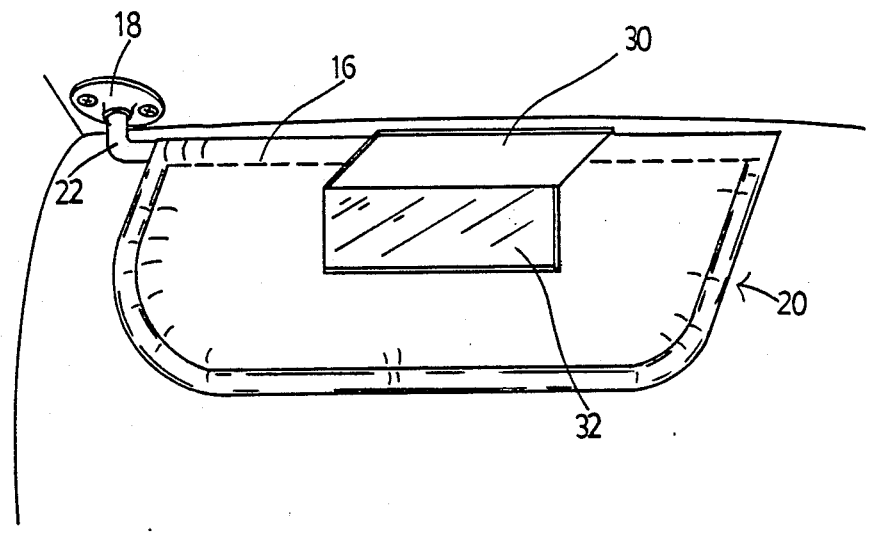
FIG. 3 shows a view of the sun visor of FIG. 2 showing a further optional feature.
Figure 4:
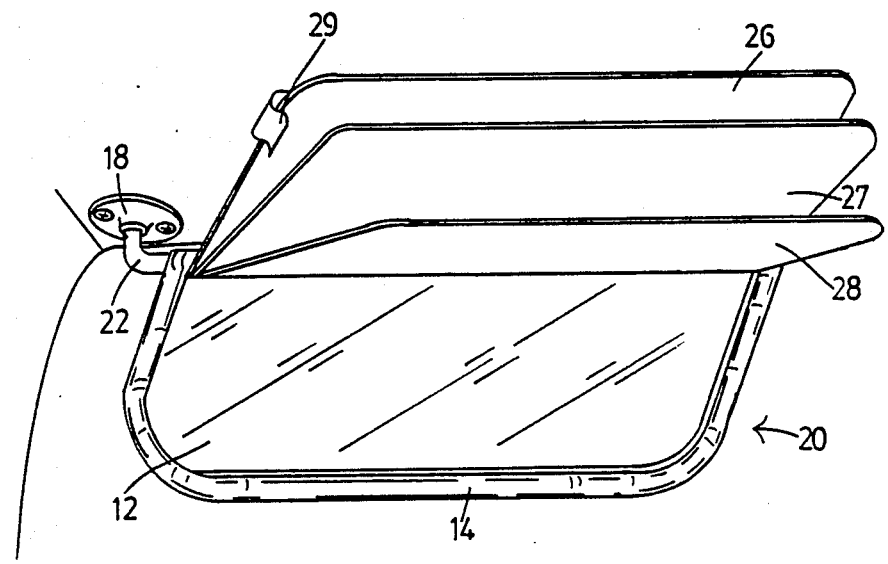
FIG. 4 shows another sun visor similar to that of FIG. 2 showing further additional features.

Additional features may be provided on sun visor 20. An additional flap 30 smaller than flap 26 may be provided to cover a vanity mirror 32 on a rear surface of flap 26 (See FIG. 3). A top edge of flap 30 may be hinged to flap 26 in a similar manner to that described in connection with the hinge 16 of flap 26. It may be advantageous to cover a vanity mirror with a covering means such a flap 30 to inhibit danger of the mirror reflecting glare into a driver's eyes.

It is also possible to provide additional transparent flaps 27, 28 coextensive with the window 12. Each additional flap 27, 28 may be hinged along a respective top edge to frame 14 between the window 12 and opaque flap 26 as shown or be attachable in any other convenient way. These additional flaps 27, 28 may be of different tints or other anti-glare properties to be additively useful in reducing glare.

The composisite visor 20 is intended as a replacement visor for vehicles supplied with conventional opaque visors or for original installation in vehicles.

Pivot shaft 22, of any conventional design is connectable to a suitable strut of the vehicle through fixing pad 18. If the visor 20 is to be used as a replacement visor, it should be located at the point of original fixing and should be of a suitable type for such replacement.

In use, the composite sun visor 20 may be manipulated normally as a conventional opaque visor. However if glare conditions are such that an operator prefers to look through a transparent anti-glare screen, he may raise flap 26, and, if desired, reposition the visor 20 for view through window 12. Flap 26 is positionable at any angle to the frame 14 containing window 12. When this is so the window 12 may be positioned for optimum view therethrough and the flap 26 may be positioned as an additional opaque visor.

If additional transparent flaps 27, 28 are provided, these may be hinged into and out of operational position as required. In practice window 12 should be of the lightest anti-glare properties and flaps 27, 28 and possibly even further flaps may add further anti-glare properties for use with glare conditions of greater severity.

Means may be provided, such as clip 29 for raising flaps 27, 28 with flap 26 and for retaining them with flap 26 if desired. The flaps 27, 28 may be manually detached from clip 28 for movement into operative position when required.

I claim:

1. A vehicle sun visor comprising an open frame of a general size and shape of a vehicle sun visor, a transparent sheet of anti-glare material mounted in the open frame, the frame being pivotable into a variety of operative positions;

an opaque flap hingably connected on a rear surface of said frame and co-extensive with said transparent sheet to be movable between a closed position covering said sheet and an open position allowing view through said sheet; and means to releasably hold said flap in said open position.

2. A sun visor as claimed in claim 1 in which the flap has a rear surface provided at least one comfort facility.

3. A sun visor as claimed in claim 2 in which the comfort facility is a vanity mirror provided with a cover means hingable between a closed position shielding the mirror and an open position uncovering the mirror.

4. A sun visor as claimed in 1 in which at least one additional transparent flap is provided between said transparent anti-glare sheet and said opaque flap each additional flap being movable, when the opaque flap is open, between a first position covering the sheet and a second position uncovering the sheet.

* * * * *